United States Patent [19]

Belvederi et al.

[11] Patent Number: 5,617,943
[45] Date of Patent: Apr. 8, 1997

[54] GROUP FORMING DEVICE FOR CIGARETTE PACKING MACHINES

[75] Inventors: Bruno Belvederi, S. Martino Di Monte S. Pietro; Alberto Manservigi; Eros Stivani, both of Bologna, all of Italy

[73] Assignee: G.D Societa' Per Azioni, Bologna, Italy

[21] Appl. No.: 363,686

[22] Filed: Dec. 23, 1994

[30] Foreign Application Priority Data

Dec. 23, 1993 [IT] Italy .................. BO93A0520

[51] Int. Cl.⁶ ......................................... B65B 19/10
[52] U.S. Cl. ................. 198/418.1; 131/282; 131/283; 53/149; 53/151
[58] Field of Search ................... 53/148, 149, 150, 53/151, 444; 131/282, 283; 198/418.1, 418.4

[56] References Cited

U.S. PATENT DOCUMENTS

| | | | |
|---|---|---|---|
| 1,539,745 | 5/1925 | Kerlin et al. | 53/151 X |
| 1,926,222 | 9/1933 | Arelt | 53/151 |
| 2,759,309 | 8/1956 | Kemp | 53/151 |
| 3,263,396 | 8/1966 | Cruickshank | 53/151 X |
| 4,342,321 | 8/1982 | Zullo | 131/283 X |
| 4,507,903 | 4/1985 | Focke et al. | 53/151 |
| 4,646,938 | 3/1987 | Focke | 221/175 |
| 4,700,825 | 10/1987 | Mattei et al. | 198/419 |
| 4,750,607 | 6/1988 | Focke | 131/283 X |
| 4,856,538 | 8/1989 | Focke et al. | 131/282 |
| 4,947,872 | 8/1990 | Gamberini | 131/283 |
| 4,962,772 | 10/1990 | Manservigi et al. | 131/283 X |
| 5,201,162 | 4/1993 | Focke | 53/150 |
| 5,375,392 | 12/1994 | Oberdorf | 131/283 X |

FOREIGN PATENT DOCUMENTS

| | | | |
|---|---|---|---|
| 142319 | 2/1935 | Austria | 53/149 |
| 2453625 | 5/1975 | Germany | 131/283 |
| 368019 | 3/1932 | United Kingdom | 53/149 |

*Primary Examiner*—Karen B. Merritt
*Assistant Examiner*—Scott L. Lowe
*Attorney, Agent, or Firm*—Marshall, O'Toole, Gerstein, Murray & Borun

[57] ABSTRACT

A group-forming device for use with cigarette packing machines, wherein each group consists of a number of cigarettes arranged in at least two adjacent and offset layers, with each group being formed in a single motion on the end wall of an outlet of a feed box, such outlet being divided into a number of side-by-side channels. Respective rows of cigarettes, arranged crosswise to the direction of travel, are fed downwards along channels of dissimilar lengths, such channels being inclined approximately 60° in relation to the end wall of the outlet, at least at the layers of offset cigarettes.

4 Claims, 3 Drawing Sheets

GROUP FORMING DEVICE FOR CIGARETTE PACKING MACHINES

BACKGROUND OF THE INVENTION

The present invention relates to a group forming device for cigarette packing machines.

In particular, the present invention relates to a group forming device for cigarette packing machines; each group comprising a number of cigarettes arranged in at least two adjacent layers, wherein the cigarettes in one layer are offset in relation to those in the other layer; and the device comprising at least one outlet for the groups; each outlet comprising a number of side by side channels for feeding respective rows of cigarettes transversely in a given direction; an end wall closing and crosswise to the channels; and a lateral opening adjacent and crosswise to the end wall.

In general, the aforementioned groups consist of twenty cigarettes arranged in two layers of seven and a third layer of six cigarettes. In rigid packets, the six-cigarette layer is normally an outer layer with the cigarettes offset in relation to those of the intermediate layer, the cigarettes of which are aligned with those of the other outer layer. In soft packets, on the other hand, the six-cigarette layer is normally the intermediate layer, the cigarettes of which are offset in relation to those of both the outer layers.

On known cigarette packing machines, group forming devices of the above type constitute the output portion of the input feedbox of the packing machine, and normally comprise three side by side outlets which, as described for example in U.S. Pat. No. 4,700,825, are associated with respective lateral push devices for feeding respective layers of cigarettes into successive pockets of a pocket conveyor extending to the side of the outlets. That is, each pocket is supplied by each outlet with a respective layer, and all three outlets cooperate in forming each group.

Known group forming devices of the above type present a number of both technical and functional drawbacks. Firstly, forming each group in successive layers involves the use of a large number of push and guide members for successively feeding the layers into each pocket and maintaining them in an orderly position inside the pockets as the groups are formed. Secondly, the cigarettes in the layers following the first are fed into the respective pockets on the conveyor by sliding them over the cigarettes in the layer underneath, thus resulting in friction and possible damage to the cigarettes.

SUMMARY OF THE INVENTION

It is an object of the present invention to provide a group forming device designed to overcome the aforementioned drawbacks.

According to the present invention, there is provided a group forming device for cigarette packing machines; each group comprising a number of cigarettes arranged in at least two adjacent layers, wherein the cigarettes in one layer are offset in relation to the cigarettes in the other layer; the device comprising at least one outlet for said groups; and each outlet comprising a number of side by side channels for feeding respective rows of cigarettes transversely in a given direction; an end wall closing and crosswise to said channels; and a lateral opening adjacent and crosswise to said end wall; characterized in that said channels are inclined approximately 60° in relation to said end wall, at least at the layers of offset cigarettes.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
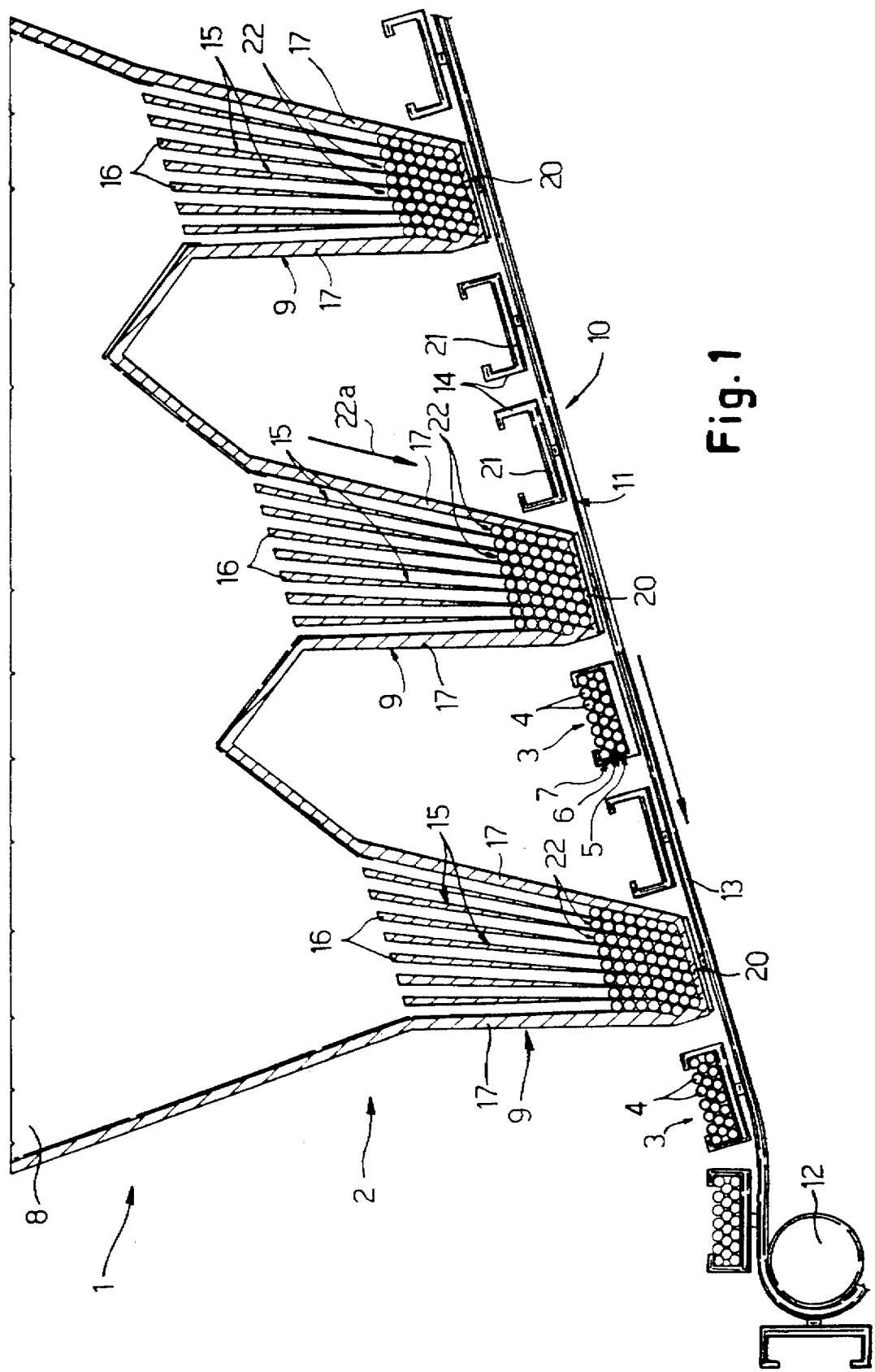
FIG. 1 shows a partially sectioned front view, with parts removed for clarity, of a preferred embodiment of the group forming device according to the present invention.

Number 1 in FIG. 1 indicates a cigarette packing machine comprising a device 2 for forming groups 3 of cigarettes 4. In the example shown, each group 3 comprises three superimposed layers 5, 6, 7 of cigarettes 4, layer 6 of which is an intermediate layer wherein cigarettes 4 are offset in relation to those of layers 5 and 7.

Machine 1 presents an input feedbox 8, the output of which is defined by three outlets 9 forming part of device 2 and which provide for feeding cigarettes 4 from feedbox 8 to a pocket conveyor 10. Conveyor 10 comprises a belt 11 looped about pulleys 12 (only one shown) and in turn comprising a transportation branch 13 extending in front of outlets 9 and fitted with pockets 14 for receiving respective groups 3.

Figure 2:
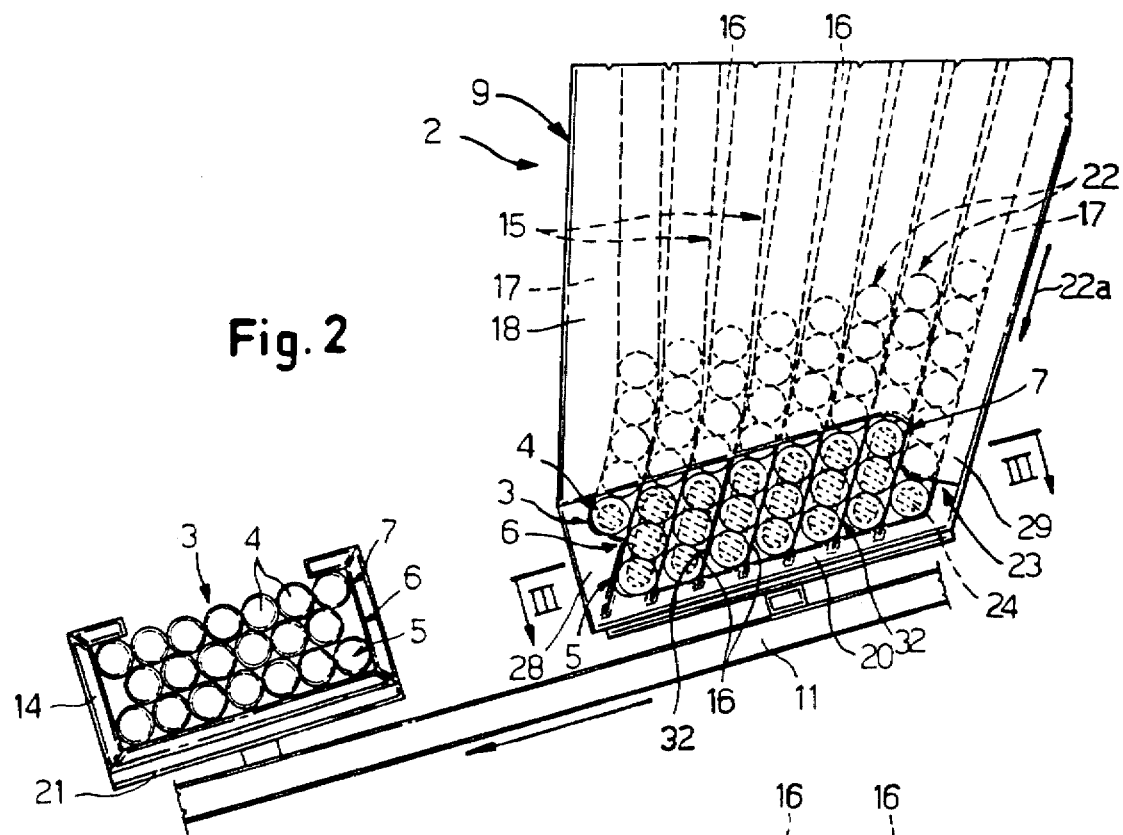
FIG. 2 shows a larger-scale detail of FIG. 1.

As shown in more detail in FIG. 2, each outlet 9 comprises a number of side by side channels 15 extending downwards from the bottom end of feedbox 8, and defined by a number of side by side partitions 16 housed between two outer walls 17 extending transversely to branch 13 of conveyor 10 and on either side of and alongside partitions 16. Partitions 16 are limited laterally by two lateral walls 18 and 19 crosswise to partitions 16 and of which wall 18 faces and is parallel to branch 13 of conveyor 10; and are limited at the bottom by an end wall 20 parallel to branch 13 of conveyor 10 and coplanar with bottom walls 21 of pockets 14.

In the FIG. 1 and 2 example, channels 15 are positioned substantially vertically to feed respective rows 22 of cigarettes 4 in direction 22a crosswise to cigarettes 4, and towards wall 20 which forms an angle of approximately 60° with partitions 16. As a consequence of the angle of partitions 16 in relation to wall 20, the cigarettes 4 forming the three superimposed layers of group 3 adjacent to wall 20 inside each outlet 9 assume a quincuncial configuration wherein the cigarettes 4 in each of the three layers are offset in relation to those of each adjacent layer.

Figure 3:
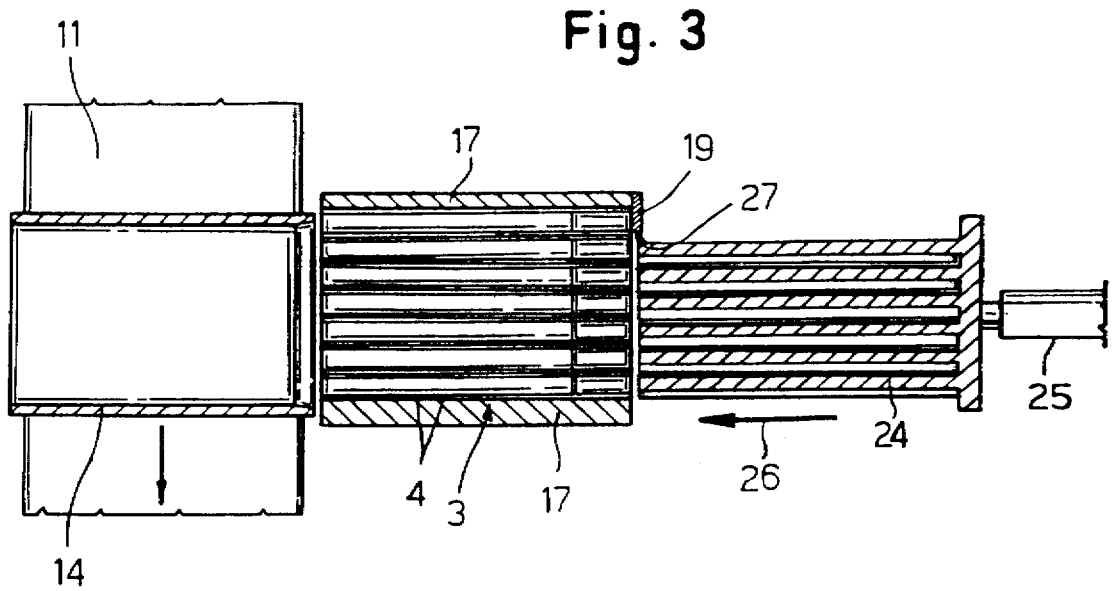
FIG. 3 shows a section along line III—III in FIG. 2.

As shown in FIG. 2, at the bottom end, wall 18 of each outlet 9 presents an opening or window 23 of substantially the same shape as the section of group 3. In other words, window 23 is so shaped as to permit the group 3 adjacent to wall 20 to be expelled in one go from outlet 9 by means of a respective comb type push device 24 (FIG. 3) which, by means of an actuator 25, is moved back and forth in a direction 26 parallel to the axes of cigarettes 4, and through an opening 27 formed in wall 19 and facing window 23, to transfer group 3 from the bottom of outlet 9 into a respective pocket 14 positioned in front of respective window 23.

The FIG. 2 embodiment relates to a device 2 for forming soft packet groups 3. To enable the formation of groups 3 wherein layer 6 comprises six cigarettes 4, and layers 5 and 7, while still at the bottom end of outlet 9 and due to the inclination of channels 15, respectively project by one cigarette 4 on either side of layer 6, the number of channels 15 in each outlet 9 is one more than the maximum number of cigarettes 4—in the example shown, seven—in each of layers 5 and 7; and, at window 23, the number of cigarettes 4 in the two outermost channels 15 is reduced to one by a projection 28 extending upwards from wall 20 on one side to shorten one of the outermost channels 15, and by an appendix 29 projecting downwards from the bottom edge of wall 18 on the other side.

Figure 4:
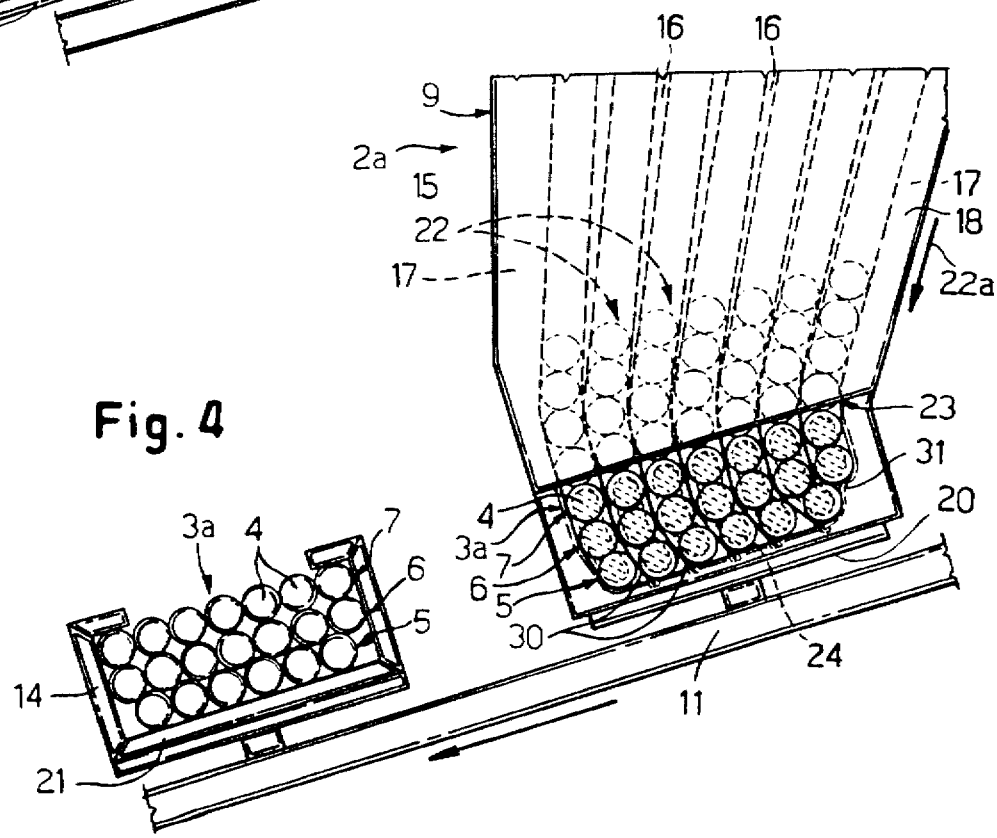
FIG. 4, similar to FIG. 2, shows a variation of the FIG. 2 detail.

The FIG. 4 variation relates to a device 2a for forming rigid packet groups 3a. To enable the formation of groups 3a wherein layer 5 comprises six cigarettes 4 offset in relation to cigarettes 4 in layer 6, and cigarettes 4 in layer 6 are arranged facing corresponding cigarettes 4 in layer 7, only a bottom end portion 30 of partitions 16, of a length at most equal to two cigarette diameters, is arranged at approximately 60° in relation to wall 20; the number of channels 15 in each outlet 9 equals the maximum number of cigarettes 4—in the example shown, seven—in each of layers 6 and 7; and, at window 23, the number of cigarettes 4 in one of the outermost channels 15 is reduced to two by a projection 31 extending upwards from wall 20, while the partition 16 adjacent to projection 31 presents substantially no end portion 30.

In actual use, both in the case of device 2 and 2a, the cigarettes 4 at window 23 form a finished group 3, 3a which may be transferred in one go by push device 24 into a respective pocket 14 on conveyor 10. In this connection, it should be pointed out that the cigarettes 4 at window 23 in the FIG. 1 and 2 embodiment, i.e. along an inclined end portion 32 of channels 15, defined by end portion 30 of partitions 16, are not perfectly offset in relation to cigarettes 4 in at least one of the adjacent layers, but automatically assume the desired offset position when the respective group 3, 3a is fed into respective pocket 14.

Figure 5:
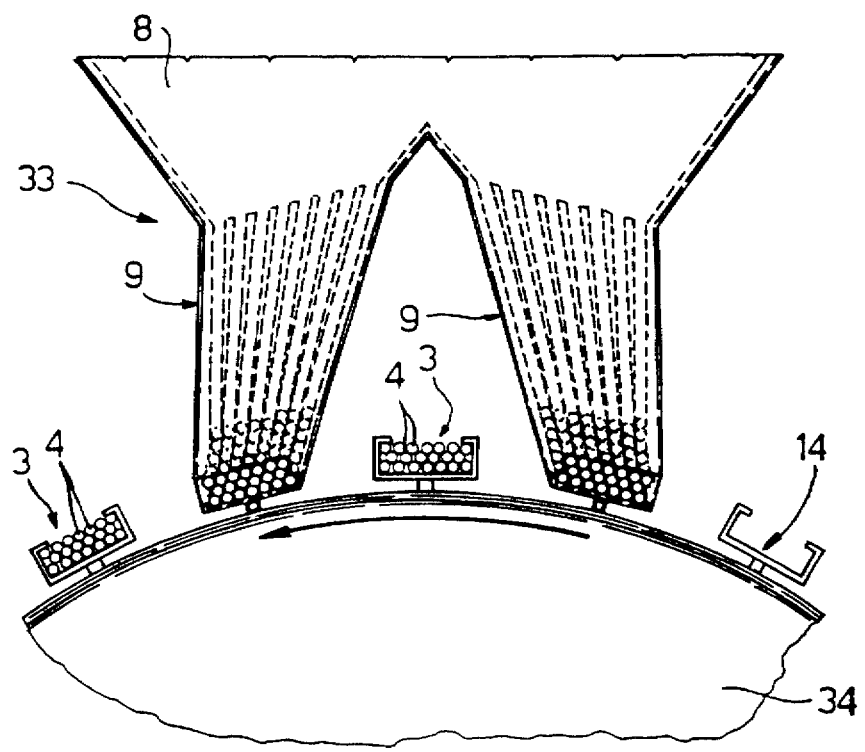
FIG. 5 shows a front view of a variation of the FIG. 1 device.

The FIG. 5 variation relates to a device 33 similar to device 2, and differing solely in that outlets 9 cooperate with a pocket conveyor defined by a roller 34 step-rotated anti-clockwise in FIG. 5.

We claim:

1. A group-forming device for cigarette packing machines (1); each group (3; 3a) comprising a number of cigarettes (4) arranged in at least two adjacent layers (5, 6), wherein the cigarettes (4) in one layer (5; 6) are offset in relation to the cigarettes (4) in the other layer (6; 5); the device (2; 2a) comprising at least one outlet (9) for said groups (3; 3a); and each outlet (9) comprising a number of side-by-side channels (15) for feeding respective rows (22) of cigarettes (4) transversely in a given direction (22a); an end wall (20) closing and crosswise to said channels (15); and a lateral opening (23) adjacent and crosswise to said end wall (20); said channels (15) being, at least at the layers (5, 6) of offset cigarettes (4), straight channels inclined approximately 60° in relation to said end wall (20); one of said channels being a shorter channel.

2. A device as claimed in claim 1, characterized in that said channels (15) extend in a substantially vertical direction (22a).

3. A device as claimed in claim 1 characterized in that said lateral opening (23) presents the same shape as the cross section of said group (3; 3a).

4. A device as claimed in claim 3, characterized in that it comprises a comb type push device (24) movable through said outlet (9) and the respective said channels (15) and to and from said lateral opening (23) to successively expel said groups (3; 3a) from the outlet (9).

* * * * *